Oct. 23, 1956  J. E. BEVINS ET AL  2,767,580
FLUID FLOW INDICATING APPARATUS
Filed Feb. 26, 1952
2 Sheets-Sheet 1
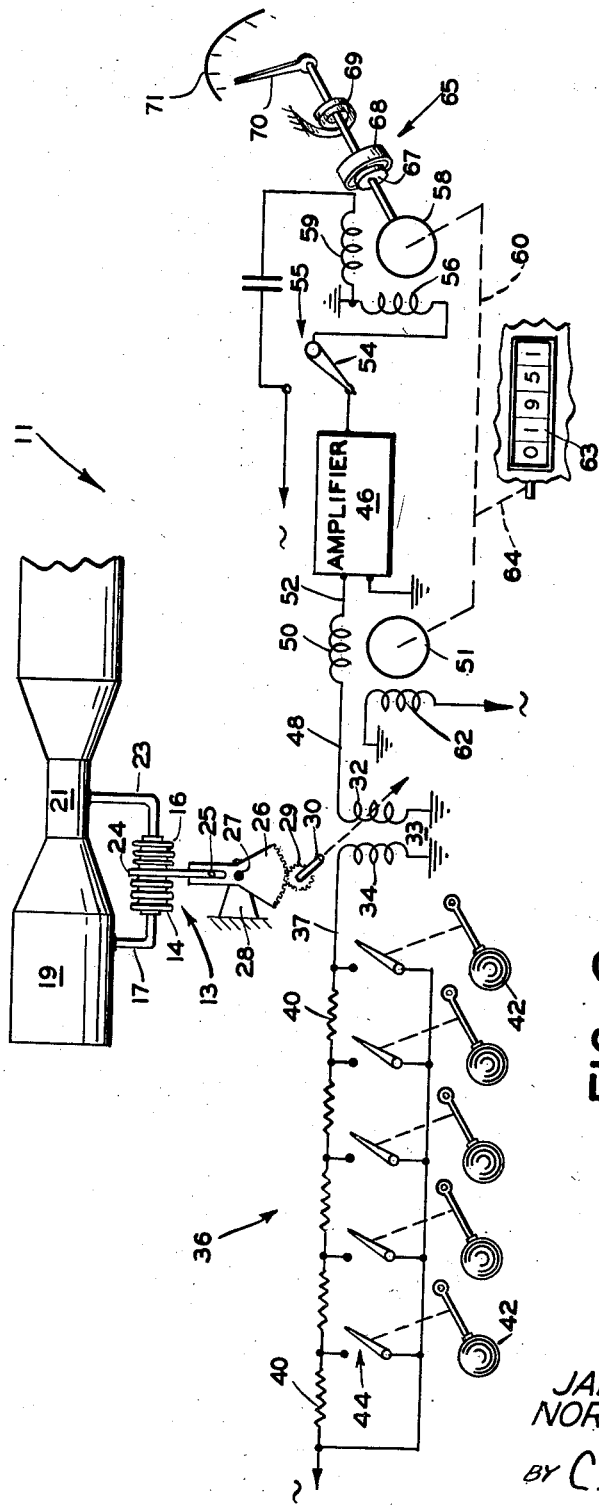
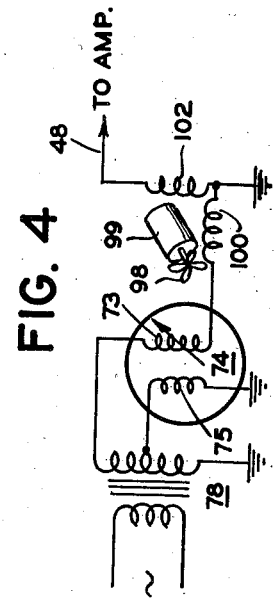
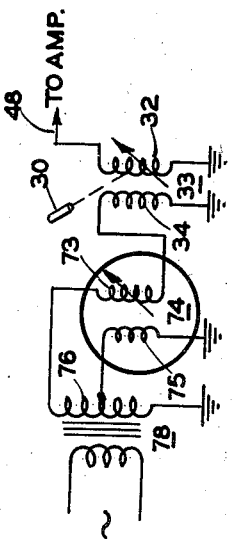
INVENTORS
JAMES E. BEVINS
NORMAN F. HOSFORD
BY C. R. Miranda
ATTORNEY Oct. 23, 1956 J. E. BEVINS ET AL 2,767,580
FLUID FLOW INDICATING APPARATUS
Filed Feb. 6, 1952 2 Sheets-Sheet 2
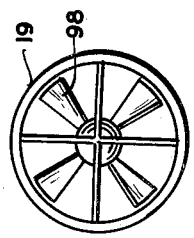
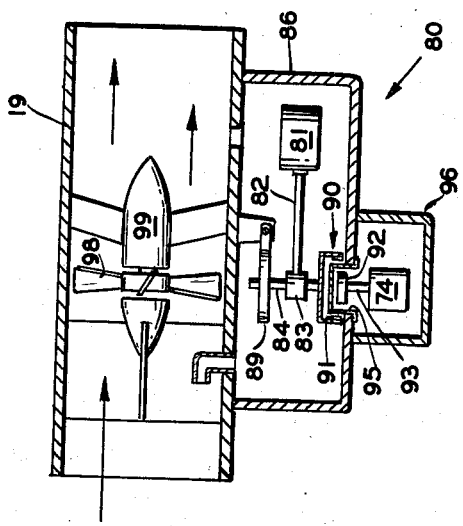
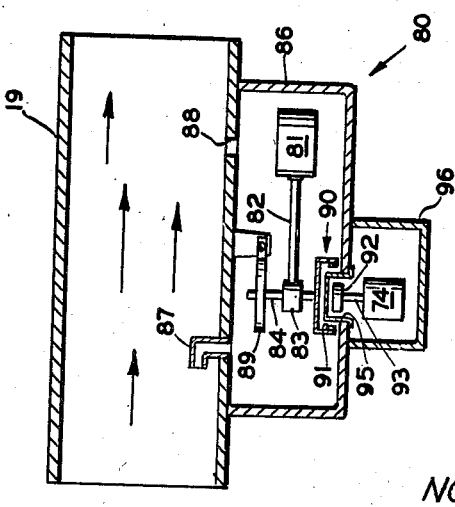
INVENTORS
JAMES E. BEVINS
NORMAN F. HOSFORD
BY C. R. Miranda
ATTORNEY United States Patent Office 2,767,580
Patented Oct. 23, 1956

2,767,580

FLUID FLOW INDICATING APPARATUS

James E. Bevins, Ramsey, N. J., and Norman F. Hosford, Davenport, Iowa, assignors to Bendix Aviation Corporation, Teterboro, N. J., a corporation of Delaware Application February 26, 1952, Serial No. 273,372

16 Claims. (Cl. 73—213)

This invention relates to indicating systems and more particularly to a system for measuring and indicating the mass flow of a fluid through a conduit.

Experience in the measurement of fluids has shown that the density of the fluid must be taken into consideration if a correct measurement is to be obtained. Apparatus which are used for measuring one type of fluid may not be accurate for measuring another fluid which has a different density. It is also well known that the densities of certain types of fluids vary with changes in temperature so that means must be provided to compensate for this variable factor.

In the operation of low speed aircraft, for example, the types of fuels used do not vary appreciably in density nor are the densities of the individual fuels variable to any great degree with changes in temperature. High-speed aircraft, however, use fuels which vary to a large extent in individual densities and with changes in temperature so that provision must be made in measuring apparatus to compensate for this variable factor. It is extremely important for the pilots of high speed aircraft to know the exact amount of fuel consumed by the craft's engines and/or the amount of fuel remaining in the fuel tanks because of the large quantities of fuel consumed in a relatively short period of time. If the density of the fuel is not taken into consideration, an indication of the fuel consumed will be incorrect and conceivably the pilot may be forced to land his craft at a place other than that originally contemplated.

The present invention in one aspect contemplates the provision of means including transmitter means actuated by the flow of fluid for developing a first periodically varying signal having a magnitude which corresponds to or is representative of the mass rate of flow of the fluid, a variable-speed motor which is operable in accordance with the first signal, a continuously running rate generator driven by the motor for developing a periodically varying feedback signal having a magnitude which corresponds to the speed of operation of the motor and which is less than the magnitude of the first signal, means for coupling or connecting the first signal and the feedback signal in opposition so that such signals are added algebraically to produce a periodically varying control signal which has a magnitude corresponding to or representative of the difference in the magnitudes of the first signal and the feedback signal and which controls the speed of the motor so that the motor rotates continuously at a speed which is substantially directly proportional to the mass rate of flow of the fluid, and fluid quantity indicating means including counter means responsive to the operation of the motor for indicating the quantity of fluid remaining or for indicating the quantity of fluid which has already been transferred or consumed.

The present invention in another aspect contemplates a fluid flow measuring and indicating system wherein means are provided for developing a signal corresponding to the flow of a fluid. Density sensing means is provided which develops a signal corresponding to the density of the fluid and is connected for varying the magnitude of the first signal to effect a fluid flow measuring signal compensated for density. The compensated signal is amplified to drive a motor, which in turn, drives a rate generator which develops a rate signal. Means are provided for algebraically adding the rate signal and the density compensated signal to effect a control signal for controlling the speed of operation of the motor. Switching means is provided in the motor circuit to control the direction of rotation of the motor for resetting a fluid consumption counter.

An object of the present invention, therefore, is to provide a novel and improved mass fluid flow measuring system.

Another object is to provide an improved mass fluid flow measuring system for indicating mass fluid flow compensated for density variations of the fluid.

Still another object is to provide a novel fluid flow measuring system wherein a signal corresponding to the flow of a fluid is varied by a density sensing means which varies the magnitude of the signal to effect a flow signal compensated for density.

A still further object is to provide a novel density corrected gravimetric flowmeter.

The above and other objects and advantages of the present invention will appear more fully hereinafter from a consideration of the detailed description which follows taken together with the accompanying drawings wherein several embodiments of the invention are illustrated.

In the drawings wherein like reference characters refer to like parts throughout the several views:

Fig. 1 is a diagrammatic illustration of the novel fluid flow measuring system of the present invention;

Fig. 2 is a diagrammatic illustration of a second embodiment of the present invention and wherein the density sensing means is different from the density sensing means of Fig. 1;

Fig. 3 is a top plan view of the density sensing means of Fig. 2;

Fig. 4 is a diagrammatic illustration of a third embodiment of the present invention and wherein the fluid flow signal generating means is different from the fluid flow signal generating means of Figs. 1 and 2;

Fig. 5 is a top plan view of the fluid flow signal generating means and the density sensing means of Fig. 4; and Fig. 6 is a cross-sectional view of the conduit of Fig. 5 and, showing in particular, the vanes of the impeller type actuator employed with the system of Fig. 4.

Referring now to the drawings for a more detailed description of the present invention, and more particularly to Fig. 1 wherein one embodiment thereof is clearly illustrated, a fluid flow measuring and indicating system, generally designated by the numeral 11, is shown as comprising a differential pressure bellows motor 13 which includes a pair of expansible and contractible bellows 14 and 16, respectively. Connected to the interior of bellows 14 is a pipe 17 which introduces the pressure caused by fluid flow in a conduit 19 from the high pressure side of a venturi 21 formed in the conduit. The interior of bellows 16 is subjected to fluid flow pressure on the low pressure side of venturi 21 by a pipe 23 connected to the conduit. Secured to adjacent ends of bellows 14 and 16 is a circular plate 24 which seals the bellows from each other. When a change occurs in the flow of fluid flowing in conduit 19 motion of plate 24 is effected and its displacement, except for the provision of the square root means referred to below, would be proportional to the differential pressure existing across the bellows. However, as is well understood to those skilled in the art, the movement of plate 24 is modified in the present instance by suitable square root means, such as the special spring means referred to below, so as to be proportional to the square root of the pressure drop in the venturi, since the magnitude of the rate of flow of fluid through a venturi is equal to a constant times the square root of the pressure drop therein and since it is desired in the present instance to have the motion of plate 24 proportional to the rate of flow of fluid. Accordingly, spring means (not shown) are employed with the bellows so that the displacement of plate 24 is proportional to the square root of the pressure drop so as to effect linear motion of the plate with changes in flow of the fluid.

Plate 24 has secured thereto a pin 25 which extends into the bifurcated end of a gear sector 26 which is adapted to be pivoted about a pin 27 secured to a fixed mounting bracket 28. Sector 26 has a toothed portion which meshes with a pinion 29 mounted on an actuating shaft 30, a continuation of which is shown in broken lines directly connected to an angularly displaceable secondary winding 32 of a variable transformer or signal generator 33. Inductively coupled with winding 32 is a stationary primary winding 34 forming part of transformer 33 and adapted to have applied to it an exciting voltage.

The output of winding 32 is found by multiplying the exciting voltage applied to the primary winding by the cosine of $\theta$, the latter being the angle between windings 32 and 34. If the excitation is maintained constant, the magnitude of the signal from winding 32 corresponds to the angular displacement of the latter winding from null. From the foregoing, it is apparent that the above relation may be used in the present system to produce an electrical signal proportional to the rate of flow of the fluid inasmuch as the motion of plate 24 corresponds to flow rate.

In order to produce a flow signal compensated for changes in density of the fluid being measured, a densitometer generally designated by the numeral 36 is connected in circuit with primary winding 34 by way of a conductor 37. Densitometer 36 comprises a variable resistance which consists of a plurality of series-arranged resistors 40 connected between a suitable source of alternating current (not shown) and primary winding 34. Each of the resistors is acurately calibrated to represent a specific gravity of the fluid being measured, and associated with the individual resistors is a pivoted hydrometer float 42 which operates a switch 44. The hydrometer floats are entirely submerged in the fluid and operate over a range of specific gravities with increments of .015 for each float. The individual floats are raised from the positions shown when the fluid reaches the specific gravity value at which it has been calibrated. When the floats are raised, the associated switch is closed to "short-out" its respective resistor 40; whereas the resistors are in the circuit when all of the floats are down. Thus, if all the floats are down, the densitometer's resistance will be at a maximum and when all the floats are up, the total resistance will be at a minmium. Five resistors 40 are shown in Fig. 1 but it is to be understood that the number of resistors may be varied according to the specific gravity range desired. In practice, the present system has been calibrated for a specific gravity range of from .660 up to .870, each float operating with increments of .015. It may be seen that the resistance of densitometer 36 results in a voltage drop to the excitation voltage for primary winding 34. In this manner, the output voltage of the densitometer is made a function of the density of the liquid.

By selecting suitable resistance values for the various resistors therein in a manner well understood in the art, the densitometer is so calibrated that the output voltage therefrom varies the excitation of primary winding 34 proportional to the square root of the density, a voltage being induced in secondary winding 32 which varies as the product of the excitation voltage and the angular position of the secondary winding. Since secondary winding 32 is positioned by differential pressure motor 13 to an angle proportional to the square root of the pressure drop and the voltage introduced on primary winding 34 is proportional to the square root of the fluid density, the signal from winding 32 corresponds to the mass fluid flow rate.

The following familiar equations show the theoretical basis of operation of the above. It is known that the volumetric flow through a venturi is:

$$V_F = K\sqrt{\Delta h}$$

where $V_F$ = volume flow rate through a given venturi
$K$ = constant including flow coefficient and venturi area factors
$\Delta h$ = drop of head in the venturi since $$V_F = \frac{W_F}{\rho}$$

where $W_F$ = weight flow rate
$\rho$ = density of the fluid and $$\Delta h = \frac{\Delta P}{\rho}$$

where $\Delta P$ = pressure drop in the venturi. Therefore the gravimetric or mass flow rate is:

$$W_F = K\rho \frac{\sqrt{\Delta P}}{\sqrt{\rho}} = K\sqrt{\rho}\sqrt{\Delta P}$$

The density compensated signal from transformer 33 is fed to the input of a conventional amplifier 46, shown as a box, by way of a conductor 48, output winding 50 of a rate signal generator 51, to be described in detail presently, and conductor 52. Connected to the output of amplifier 46, by way of a single-pole double-throw contact member 54 of a reset switch 55, the function of which will be explained in greater detail hereinafter, is the variable phase winding 56 of a two phase variable speed motor 58 which includes a fixed phase winding 59 energized from a fixed source of alternating current. The signal output from amplifier 46 determines the speed of motor 58 whereby the speed of the motor, in effect, corresponds to the signal from transformer 32.

Motor 58 is directly coupled to drive rate signal generator 51 through a gear train having a 1:1 gear ratio, as shown in Fig. 1 as a broken-line connection 60. Rate generator 51 includes a fixed phase input winding 62 constantly energized from a fixed source of alternating current. When generator 51 is driven by motor 58, a rate signal is induced in series connected output winding 50, of a phase opposite to the phase of the density compensated flow signal, to buck the latter signal thereby effecting a control signal for controlling the speed of operation of the motor. The foregoing system is so calibrated that the rate signal is always less than the transmitter signal and the resultant control signal will have increased values for increased rates of fluid flow, whereby the speed of motor 58 will be increased proportionately.

If the flow through conduit 19 should increase and the density of the fluid remains constant, the displacement of plate 24 from its normally centered position and hence the angular displacement of winding 32 will be further increased causing a large signal, at that instant, to be applied to the motor thereby increasing the speed thereof. This increased speed will cause the speed of rate signal generator 51 to increase the rate signal thereby decreasing the control signal supplied to motor 58 tending to reduce the speed thereof until an equilibrium is established corresponding to the new position of plate 24. When the increased rate of flow becomes constant, the control signal will have a greater value than the value of the control signal when the rate of flow was less, and correspondingly the motor speed will be greater. In this manner, the control signal may be made to correspond to the rate of fluid flow.

By integrating the rate of flow over the period of time fluid has been flowing, a measure of the quantity of fluid which has passed through conduit 19 will be obtained. As the rotation of motor 58 is unidirectional when fluid is flowing, the total number of revolutions taken over a period of time will be proportional to the quantity of fluid passing through the conduit during the same period of time. By connecting a counter 63 to motor 58 through a reduction gear train (not shown) but illustrated as a broken line 64, and by properly proportioning the ratio between the gears (not shown) the counter will furnish an indication of quantity of fluid passed through the conduit. Counter 63 may also be used as a fluid remaining indicator by setting in the original amount of fluid available, and subtracting therefrom continuously an amount corresponding to the quantity passed through the conduit. Thus, if the present system is used aboard aircraft to determine the amount of fuel consumed, the original amount of fuel in the fuel tanks is set in the counter and the quantity of fuel passed through the conduit will be subtracted from the original reading of the counter to indicate the amount of fuel remaining in the fuel tanks.

Reset switch 55 is provided in the system to reverse the rotation of motor 58 when it is desired to reset counter 63 back to a zero indication. When the system is in operation and fluid is passing through conduit 19, contact member 54 of switch 55 connects variable phase winding 56 of motor 58 to the output of amplifier 46, as shown in Fig. 1, to drive the motor in one direction thereby increasing the counter indication. When it is desired to reset the counter, contact member 54 is switched to its other position to connect variable phase winding 56 to the source of alternating current for fixed phase winding 59 whereby the direction of motor 58 is reversed and counter 62 will be driven to decrease its reading until its attains a zero indication. The theory of operation of two-phase motors is believed well understood by those skilled in the art and for that reason, further description of the reversing of the direction of rotation of motor 58 is believed unnecessary.

To obtain an instantaneous indication of rate of fluid flow, motor 58 is connected to the input end of a slip coupling 65 here schematically illustrated as a magnetic drag cup. The input end of coupling 65 comprises a suitable magnet 67 which rotates within a drag cup 68. Rotation of the bar magnet 67 causes eddy currents to be set up in drag cup 68 which rotates against a restraining hairspring 69 to move a pointer 70 relative to a scale 71 calibrated in rate of mass flow units. In this manner, the instantaneous rate of fluid flow may be read directly on scale 71.

A second embodiment of the invention is shown in Fig. 2 and differs from the embodiment seen in Fig. 1 only in the type of densitometer or density sensing means used; all other elements being identical. For this reason and for purposes of clarity, only the densitometer and the variable transformer 33 are illustrated, the general operation of the system being understood in view of the description of the system shown in Fig. 1. The system of Fig. 2 is used with a venturi of the type formed in conduit 19 of Fig. 1, and actuating shaft 30, the continuation of which is shown in Fig. 2, angularly displaces secondary winding 32 with respect to winding 34 to effect a voltage proportional to the square root of the pressure drop across the venturi. Connected in series with winding 34 is an angularly displaceable rotor winding 73 of a signal generator 74 having a stator winding 75 excited from the secondary winding 76 of a power transformer 78. Signal generator 74 comprises part of a densitometer generally designated by the numeral 80 which is more completely shown in Fig. 3.

Densitometer 80 comprises a mass 81 mounted on a lever arm 82 which is secured to a collar 83 on a shaft 84. The foregoing elements are located in a housing 86 positioned adjacent conduit 19, the housing having an inlet port 87 and an outlet port 88, whereby fluid may pass through the chamber of the housing so that the density thereof may be sampled. Mass 81 is completely submerged in the fluid so that the effective weight of the mass varies with the density of the fluid. Shaft 84 is restrained by a hairspring 89 and the rotation of the shaft is calibrated in terms of specific gravity. Motion of the shaft is transmitted to rotor winding 73 of signal generator 74 by a magnetic linkage 90 which comprises a ring magnet 91 secured to the shaft and a magnetic disc 92 secured to the rotor shaft 93 of generator 74. A non-magnetic shield 95 separates the magnets and serves to seal housing 86 from a housing 96 which houses signal generator 74, whereby fluid is prevented from entering the latter housing.

Thus, when changes in density of the fluid occur, mass 81 is displaced to angularly displace shaft 84 and rotor winding 73 thereby producing a density signal in the latter which varies the excitation on primary winding 34 of variable transformer 33 to effect a resultant signal from winding 32 which corresponds to the rate of fluid flow compensated for density. This signal is then fed to amplifier 46 by way of conductor 48 to drive motor 58 as set forth hereinbefore.

A third embodiment of the invention is shown in Fig. 4 and differs from the first embodiment only in the type of densitometer, flow sensing means, and signal developing means employed. The densitometers of the second and third embodiments, however, are identical. For purposes of clarity, only the densitometer, the flow sensing and signal developing means of the third embodiment are shown in Fig. 4. This embodiment employs an "unloaded" vane type impeller or propeller 98 which is positioned in conduit 19 (Fig. 5) in the flow stream. Impeller 98 is adapted to be rotated by the passing of fluid through the conduit and is connected to drive the armature of a rate signal generator 99 having an input winding 100 and a variable output winding 102. Winding 100 is energized through the rotor winding 73 of signal generator 74 and by power transformer 78. The signal from variable winding 102 of rate signal generator 99 is a product of the excitation of winding 100 and the speed of rotation of impeller 98. In this manner, the signal from winding 102 corresponds to and is a measure of the mass fluid flow rate and is fed by way of conductor 48 to amplifier 46 to drive motor 58.

The following equations show the theoretical basis of operation of the third embodiment of the invention. It is known that the volumetric flow through the impeller is:

$$V_F = KN$$

where $V_F$ = volume flow rate through the pipe
$K$ = constant
$N$ = R. P. M. of propeller since $$W_F = V_F \rho$$

where $W_F$ = mass flow rate
$\rho$ = density of fluid therefore the gravimetric or mass flow rate is:

$$W_F = K \rho N$$

From the foregoing, it may be readily understood that the impeller in the flow stream turns the armature of rate signal generator 99 producing a voltage component in variable winding 102 proportional to speed and thus proportional to the volumetric flow rate. Since the densitometer 74 varies the excitation of input winding 100 of generator 99 proportional to the specific gravity of the fluid, the voltage from winding 102 is the product of the excitation voltage and the speed of rotation of the rotor, and thus is a measure of the gravimetric fluid flow rate.

It will now be apparent that the present invention provides an improved system for accurately measuring the flow of a fluid which is subjected to changes in density or for fluids of varying densities. The provision of a densitometer which varies the excitation of the input winding of a fluid flow sensing signal generator with changes in density of the fluid to vary the magnitude of the signal in the output winding thereof provides for a highly accurate measuring system.

Although several embodiments of the present invention have been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. In combination, means including transmitter means actuated by the flow of fluid for developing a first periodically varying signal having a magnitude which corresponds to the mass rate of fluid flow, a variable-speed motor operable in accordance with said first signal, a rate generator driven by said motor for developing a periodically varying feedback signal of substantially the same frequency as said first signal and having a magnitude which corresponds to the speed of operation of said motor and which is less than the magnitude of said first signal, means for connecting said first signal and said feedback signal in opposition so that said signals are algebraically added to produce a periodically varying control signal which has a magnitude corresponding to the difference in the magnitudes of said first signal and said feedback signal and which controls said motor so that said motor rotates continuously at a speed which is substantially directly proportional to the mass rate of fluid flow, and fluid quantity indicating means comprising counter means responsive to the operation of said motor.

2. In a system for measuring the mass rate of flow of a fluid, transmitter means responsive to the fluid density and to the fluid flow for developing a first signal having a magnitude which varies directly with fluid density and which corresponds to the mass rate of fluid flow, a variable-speed motor operated in response to said first signal, means controlled by said motor for developing a feedback signal corresponding to the speed of operation of said motor, said feedback signal-developing means being connected for mixing said feedback signal with said first signal to produce a control signal substantially proportional to the difference between said two signals for controlling the speed of said motor, and a mass rate of flow indicator responsive to the speed of said motor.

3. In a fluid flow measuring apparatus, fluid flow sensing means displaceable in response to fluid flow, a displaceable transmitter signal generator displaceable by said sensing means and having an input circuit adapted to be coupled to an excitation source and a separate output circuit providing a control signal as a function of fluid flow, means responsive to the density of the fluid and connected with the input of said transmitter signal generator for modifying the excitation thereof as a function of fluid density to modify said control signal as a function of fluid density, and remote fluid flow indicating apparatus electrically coupled to said output of said transmitter signal generator and responsive to said modified control signal.

4. In a system of the type described, means responsive to the flow of a fluid for developing a first signal corresponding to the flow of fluid, means responsive to the density of the fluid for developing a signal corresponding to the density of the fluid and connected for varying the magnitude of said first signal to effect a resultant signal, a variable speed motor operated in response to said resultant signal, and means controlled by said motor for providing a signal corresponding to the speed of operation of said motor, said last means being connected for mixing said last signal and said resultant signal to effect a control signal for controlling the speed of operation of said motor.

5. In a system of the type described, means responsive to the flow of a fluid for developing a first signal corresponding to the flow of fluid, means responsive to the density of the fluid for developing a signal corresponding to the density of the fluid and connected in series with said first means for varying the magnitude of said first signal to effect a resultant signal, a variable speed motor operated in response to said resultant signal, and means controlled by said motor for providing a signal opposite in phase to said resultant signal and corresponding to the speed of operation of said motor, and means for algebraically adding said last signal to said resultant signal to effect a control signal for controlling the speed of operation of said motor.

6. In a system of the type described, means responsive to the pressure drop across a venturi device in a conduit through which fluid is flowing for developing a first signal corresponding to the square root of said pressure drop, means responsive to the density of the fluid for developing a signal corresponding to the square root of density of the fluid and connected for varying the magnitude of said first signal to effect a resultant signal corresponding to fluid flow compensated for density, a variable speed motor operated in response to said resultant signal, and means controlled by said motor for providing a signal corresponding to the speed of operation of said motor, said last means being connected for mixing said last signal and said resultant signal to effect a control signal for controlling the speed of operation of said motor.

7. In a system of the type described, means responsive to the flow a fluid for developing a first signal corresponding to the flow of fluid, means responsive to the density of the fluid for developing a signal corresponding to the density of the fluid and connected for varying the magnitude of said first signal to effect a resultant signal, a variable speed motor operated in response to said resultant signal, means controlled by said motor for providing a signal corresponding to the speed of operation of said motor, said last means being connected for mixing said last signal and said resultant signal to effect a control signal for controlling the speed of operation of said motor, and switching means in circuit with said motor and adapted to control the operation of the motor in two directions.

8. In a system of the type described, a signal generator comprising a stationary part adapted to be excited and a part movable relative thereto for developing in the movable part a first signal corresponding to the amount of displacement therebetween, means responsive to the flow of a fluid and connected for displacing said movable part so that said first signal corresponds to the flow of the fluid, means responsive to the density of the fluid for developing a signal corresponding to the density of said fluid and connected for varying the excitation of said stationary part to vary said first signal to effect a resultant signal, a motor connected for operation in response to said resultant signal, and means controlled by said motor for providing a signal corresponding to the speed of operation of said motor, said last means being connected for mixing said last signal and said resultant signal to effect a control signal for controlling the speed of operation of said motor.

9. In a system of the type described, means responsive to the flow of a fluid for developing a signal corresponding to the flow of fluid, impedance means responsive to the density of the fluid connected in circuit with said first means for varying the magnitude of said signal in accordance with the density of the fluid to effect a resultant signal, said impedance means having a maximum resistance value in the circuit when the density of the fluid is at a minimum and having a minimum resistance value in the circuit when the density of the fluid is at a maximum, a variable speed motor operated in response to said resultant signal, and means controlled by said motor for providing a signal corresponding to the speed of operation of said motor, said last means being connected for mixing said last signal and said resultant signal to effect a control signal for controlling the speed of operation of said motor.

10. In a system of the type described, means responsive to the flow of a fluid for developing a signal corresponding to the flow of fluid, a plurality of series connected resistors in circuit with said first means, each of said resistors being calibrated to represent a predetermined specific gravity value, float means associated with each of said resistors and operable in response to changes in density of said fluid to change the resistance in the circuit to vary the magnitude of said flow signal to effect a resultant signal, a variable speed motor operated in response to said resultant signal, and means controlled by said motor for providing a signal corresponding to the speed of operation of said motor, said last means being connected for mixing said last signal and said resultant signal to effect a control signal for controlling the speed of operation of said motor.

11. In a system of the type described, means responsive to the flow of a fluid for developing a first signal corresponding to the flow of fluid, a mass displaceable in response to variations in density of the fluid, means operable by said mass for developing a signal corresponding to the density of the fluid, said last means connected for varying the magnitude of said first signal to effect a resultant signal, a variable speed motor operated in response to said resultant signal, and means controlled by said motor for providing a signal corresponding to the speed of operation of said motor, said last means being connected for mixing said last signal in opposition with said resultant signal to effect a control signal representing the difference between said last mentioned signal and said resultant signal for controlling the speed of operation of said motor.

12. In a system of the type described, means responsive to the flow of a fluid for developing a first signal corresponding to the flow of fluid, a mass movable in response to variations in density of the fluid, a shaft mounting said mass and adapted to be angularly displaced by movement of said mass, a signal generator, means coupling together said shaft and said signal generator whereby the latter develops signals in response to angular displacement of said shaft, means connecting the output of said signal generator in circuit with said first means whereby said output signal varies the magnitude of said first signal to effect a resultant signal, a variable speed motor operated in response to said resultant signal, and means controlled by said motor for providing a signal corresponding to the speed of operation of said motor, said last means being connected for mixing said last signal in opposition with said resultant signal to effect a control signal representing the difference between said last mentioned signal and said resultant signal for controlling the speed of operation of said motor.

13. In a system of the type described, a signal generator comprising a stationary part adapted to be excited and a part movable relative thereto for developing in the movable part a first signal corresponding to the amount of displacement therebetween, means responsive to the flow of a fluid and connected for displacing said movable part so that said first signal corresponds to the flow of the fluid, a mass displaceable in response to variations in density of the fluid, means operable by said mass for developing a signal corresponding to the density of the fluid and connected for varying the excitation of said stationary part to vary said first signal to effect a resultant signal, a variable speed motor operated in response to said resultant signal, and means controlled by said motor for providing a signal corresponding to the speed of operation of said motor, said last means being connected for mixing said last signal and said resultant signal to effect a control signal for controlling the speed of operation of said motor.

14. In a system of the type described, a vane type impeller adapted to be actuated by the flow of fluid in a conduit, a signal generator operable by said impeller for developing a first signal corresponding to the flow of fluid, means for developing a signal corresponding to the density of the fluid and connected for varying the magnitude of said first signal to effect a resultant signal, a variable speed motor operated in response to said resultant signal, and means controlled by said motor for providing a signal corresponding to the speed of operation of said motor, said last means being connected for mixing said last signal and said resultant signal to effect a control signal for controlling the speed of operation of said motor.

15. In a system of the type described, a vane type impeller adapted to be actuated by the flow of fluid in a conduit, a signal generator operable by said impeller and having an excited winding and a variable output winding, whereby operation of said signal generator by said impeller produces a signal in said output winding corresponding to the flow of fluid, means for developing a signal corresponding to the density of the fluid, means connecting said last means to the excited winding of said signal generator for varying the excitation thereof to vary the magnitude of said first signal to produce a resultant signal, a motor actuated by said resultant signal, and means controlled by said motor for providing a signal corresponding to the speed of operation of said motor, said last means being connected for mixing said last signal and said resultant signal to effect a control signal for controlling the speed of operation of said motor.

16. In a system of the type described, a vane type impeller adapted to be actuated by the flow of fluid in a conduit, a signal generator operable by said impeller and having an excited winding and a variable output winding, whereby operation of said signal generator by said impeller produces a first signal in said output winding corresponding to the flow of fluid, a mass displaceable in response to variations in density of the fluid, means operable by displacement of said mass for developing a signal corresponding to the density of the fluid and connected for varying the excitation of said excited winding to change the magnitude of said first signal to produce a resultant signal, a variable speed motor connected for operation by said resultant signal, and means controlled by said motor for providing a signal corresponding to the speed of operation of said motor, said last means being connected for mixing said last signal and said resultant signal to effect a control signal for controlling the speed of operation of said motor.

References Cited in the file of this patent

UNITED STATES PATENTS

| 1,602,444 | Naiman | Oct. 12, 1926 |
| 2,221,943 | Fischer | Nov. 19, 1940 |
| 2,401,421 | Hahn | June 4, 1946 |
| 2,488,221 | Moore | Nov. 15, 1949 |

FOREIGN PATENTS

| 616,248 | Great Britain | Jan. 19, 1949 |